(12) United States Patent
Marleau-Finley

(10) Patent No.: US 12,163,433 B2
(45) Date of Patent: Dec. 10, 2024

(54) RUNNER CLEARANCE OPTIMIZATION USING TAILORED MATERIAL DENSITY

(71) Applicant: PRATT & WHITNEY CANADA CORP., Longueuil (CA)

(72) Inventor: Julien Marleau-Finley, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/188,939

(22) Filed: Mar. 23, 2023

(65) Prior Publication Data

US 2024/0318569 A1 Sep. 26, 2024

(51) Int. Cl.
*F01D 11/00* (2006.01)
*F01D 25/16* (2006.01)

(52) U.S. Cl.
CPC .......... *F01D 11/003* (2013.01); *F01D 25/16* (2013.01); *F05D 2240/55* (2013.01)

(58) Field of Classification Search
CPC .......... F01D 25/16; F01D 25/183; F02C 7/06; F02C 7/28
See application file for complete search history.

(56) References Cited

U.S. PATENT DOCUMENTS

| | | | |
|---|---|---|---|
| 6,322,081 B1 * | 11/2001 | Ullah | F16C 33/76 277/504 |
| 8,753,014 B2 | 6/2014 | Devitt | |
| 10,927,960 B2 | 2/2021 | Bernacchi et al. | |
| 11,415,225 B2 | 8/2022 | Swift et al. | |
| 11,549,444 B2 | 1/2023 | Beinor et al. | |
| 2012/0177486 A1 * | 7/2012 | Ullah | F16J 15/3464 415/174.3 |
| 2014/0265151 A1 * | 9/2014 | Vasagar | F01D 11/003 277/500 |
| 2017/0234430 A1 * | 8/2017 | Fadgen | F16J 15/441 277/500 |
| 2017/0234432 A1 * | 8/2017 | Burnside | F16J 15/3464 277/572 |
| 2020/0248814 A1 * | 8/2020 | Schubert | F16J 15/26 |
| 2020/0248815 A1 * | 8/2020 | Bernacchi | F16J 15/26 |

FOREIGN PATENT DOCUMENTS

WO WO-9521319 A1 * 8/1995 ............ F01D 11/127

* cited by examiner

*Primary Examiner* — J. Todd Newton
*Assistant Examiner* — Cameron A Corday
(74) *Attorney, Agent, or Firm* — NORTON ROSE FULBRIGHT CANADA LLP

(57) ABSTRACT

An aircraft engine, has: a shaft rotatable about a central axis; a housing mounted around the shaft; and a seal assembly disposed radially between the shaft and the housing relative to the central axis, the seal assembly having: a sealing ring mounted to the housing, and a seal runner secured to the shaft, the seal runner extending radially relative to the central axis from an inner face facing the shaft to an outer face facing the sealing ring and being radially spaced apart from the sealing ring by a gap, the seal runner having an inner section extending from the inner face towards the outer face, and an outer section extending from the outer face towards the inner face, a density of the outer section being less than that of the inner section, the density defined as a mass per unit of volume of the seal runner.

20 Claims, 4 Drawing Sheets

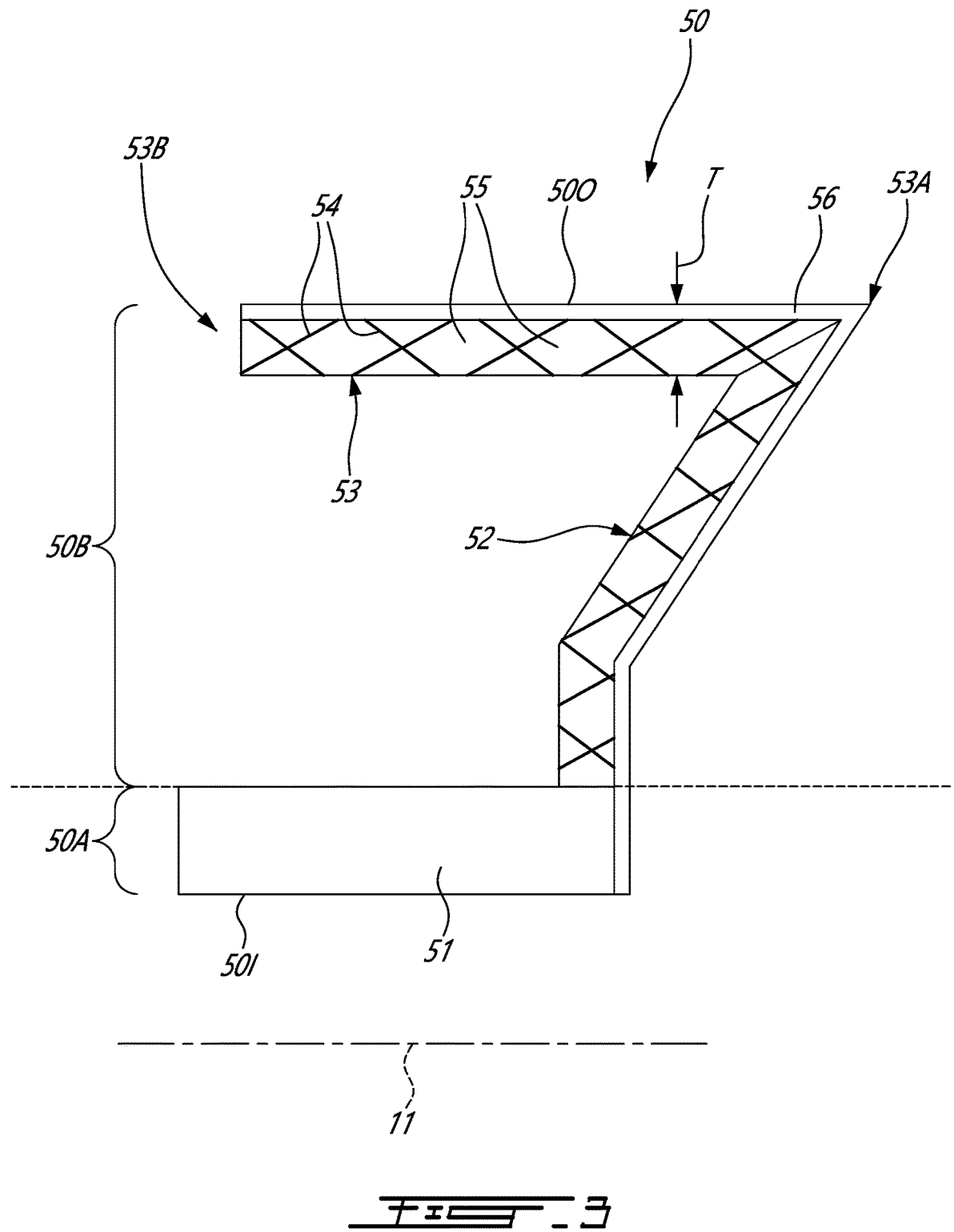

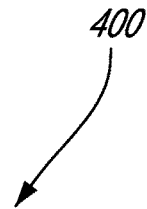

400

Permit a flow of compressed air into the cavity through a gap defined between an outer section of a seal runner and a sealing ring of a seal, the seal runner secured to the shaft via an inner section of the seal runner disposed radially inwardly of the outer section — 402

At least partially compensating for an increase in a centrifugal force exerted on the outer section of the seal runner with the outer section having a density less than that of the inner section of the seal runner. — 404

FIG. 4

RUNNER CLEARANCE OPTIMIZATION USING TAILORED MATERIAL DENSITY

TECHNICAL FIELD

The application relates generally to aircraft engines and, more particularly, to systems and methods for sealing a compartment, such as a bearing housing.

BACKGROUND

Gas turbine engines often require seals to isolate cavity, such as a bearing cavity, from an environment outside thereof. The seals are used to keep lubricant within the bearing cavity. A type of seal used for this purpose is referred to as a controlled gap seal in which a small controlled gap is defined between a rotating part, referred to as a seal runner, and a static part, referred to as a sealing ring. The bearing cavity is typically pressurized from the outside such that a flow of compressed air is able to circulate through the controlled gap thereby limiting leakage of the lubricant. However, thermal growth and centrifugal force affect a dimension of this controlled gap, which may results in a decrease of the sealing efficiency in some conditions. Improvements are therefore sought.

SUMMARY

In one aspect, there is provided an aircraft engine, comprising: a shaft rotatable about a central axis; a housing mounted around the shaft, the shaft rotatable relative to the housing; and a seal assembly disposed radially between the shaft and the housing relative to the central axis, the seal assembly having: a sealing ring mounted to the housing, and a seal runner secured to the shaft, the seal runner extending radially relative to the central axis from an inner face facing the shaft to an outer face facing the sealing ring and being radially spaced apart from the sealing ring by a gap, the seal runner having an inner section extending from the inner face towards the outer face, and an outer section extending from the outer face towards the inner face, a density of the outer section being less than that of the inner section, the density defined as a mass per unit of volume of the seal runner.

The aircraft engine described above may include any of the following features, in any combinations.

In some embodiments, the inner section is made of a first material having a first density and the outer section is made of a second material having a second density less than the first density.

In some embodiments, the outer section includes a cellular material.

In some embodiments, the inner section is axially clamped on the shaft, the inner section devoid of the cellular material.

In some embodiments, the seal runner includes a base secured to the shaft and defining the inner face, a sealing flange secured to the base and defining the outer face, and a web connecting the sealing flange to the base, the inner section corresponding to the base, the outer section including the sealing flange.

In some embodiments, the outer section further includes the web.

In some embodiments, the sealing flange includes a cellular material.

In some embodiments, the cellular material has an open cell structure.

In some embodiments, the outer face is defined by a top layer disposed over the cellular material, the top layer being impermeable.

In another aspect, there is provided a seal assembly, comprising a sealing ring circumferentially extending around a central axis; and a seal runner disposed radially inwardly of the sealing ring relative to the central axis, the seal runner having an inner face facing the central axis, and an outer face facing the sealing ring and spaced apart from the sealing ring by a gap, wherein a density of the seal runner decreases in a radially outward direction away from the central axis, the density defined as a mass per unit of volume of the seal runner.

The seal assembly described above may include any of the following features, in any combinations.

In some embodiments, the seal runner includes an inner section defining the inner face and made of a first material having a first density, the seal runner includes an outer section defining the outer face and made of a second material having a second density less than the first density.

In some embodiments, the outer section includes a cellular material.

In some embodiments, the inner section is devoid of the cellular material.

In some embodiments, the seal runner includes a base defining the inner face, a sealing flange secured to the base and defining the outer face, and a web connecting the sealing flange to the base, a density of the sealing flange less than that of the base.

In some embodiments, a density of the web is less than that of the base.

In some embodiments, the sealing flange includes a cellular material.

In some embodiments, the cellular material has an open cell structure.

In some embodiments, the outer face is defined by a top layer disposed over the cellular material, the top layer being impermeable.

In yet another aspect, there is provided a method of sealing a cavity disposed radially between a housing and a shaft of an aircraft engine, the method comprising: permitting a flow of compressed air into the cavity through a gap defined between an outer section of a seal runner and a sealing ring of a seal, the seal runner secured to the shaft via an inner section of the seal runner disposed radially inwardly of the outer section; and at least partially compensating for an increase in a centrifugal force exerted on the outer section of the seal runner with the outer section having a density less than that of the inner section of the seal runner.

In some embodiments, the at least partially compensating for the increase in the centrifugal force exerted on the outer section of the seal runner includes providing the seal runner with the outer section made of a cellular material.

BRIEF DESCRIPTION OF THE DRAWINGS

Reference is now made to the accompanying figures in which:

FIG. 3 is a cross-sectional view of a seal runner for the bearing housing assembly of FIG. 2 in accordance with one embodiment; and FIG. 4 is a flowchart illustrating steps of sealing a cavity.

DETAILED DESCRIPTION

Figure 1:
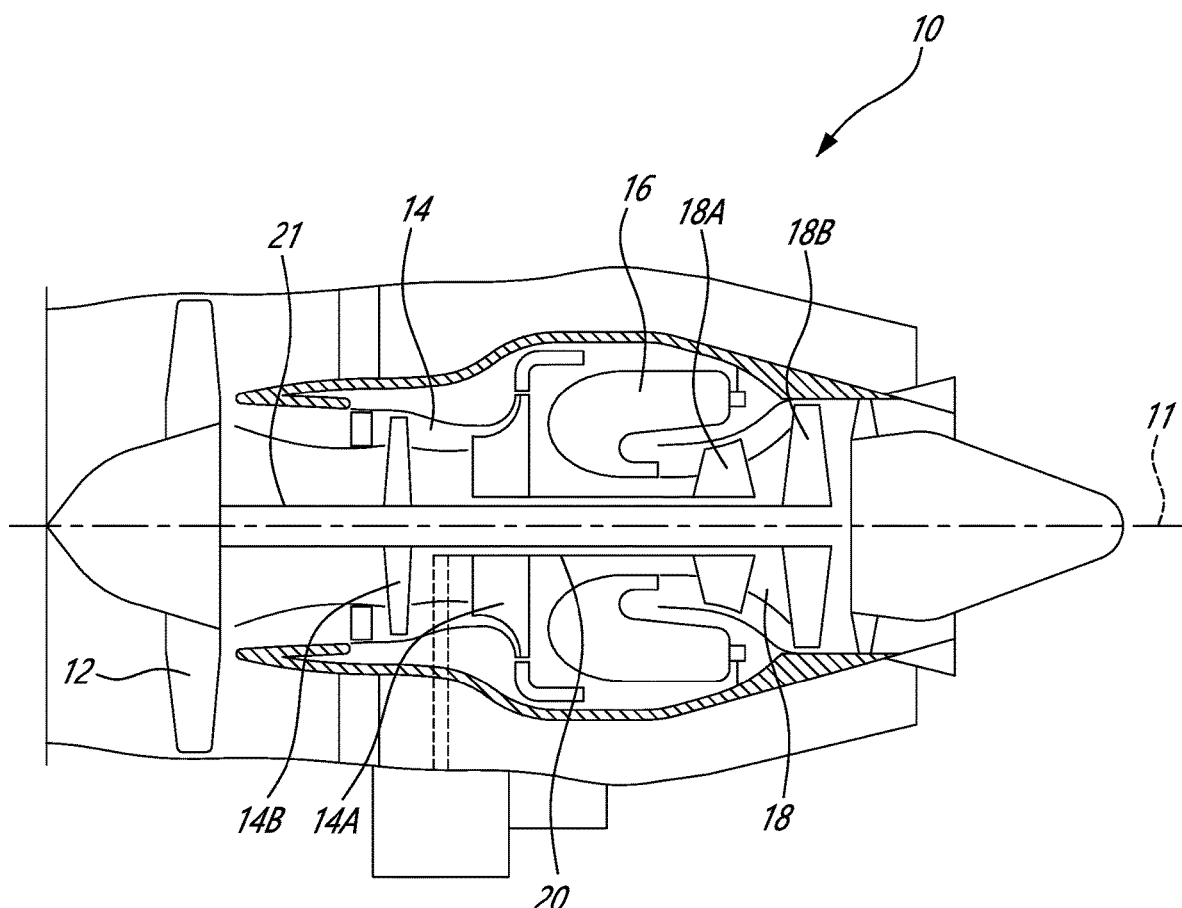
FIG. 1 is a schematic cross-sectional view of an aircraft engine depicted as a gas turbine engine.

FIG. 1 illustrates an aircraft engine depicted as a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10.

In the embodiment shown, the gas turbine engine 10 comprises a high-pressure spool having a high-pressure shaft 20 drivingly engaging a high-pressure turbine 18A of the turbine section 18 to a high-pressure compressor 14A of the compressor section 14, and a low-pressure spool having a low-pressure shaft 21 drivingly engaging a low-pressure turbine 18B of the turbine section to a low-pressure compressor 14B of the compressor section 14 and drivingly engaged to the fan 12. It will be understood that the contents of the present disclosure may be applicable to any suitable engines, such as turboprops and turboshafts, and reciprocating engines, such as piston and rotary engines without departing from the scope of the present disclosure.

Figure 2:
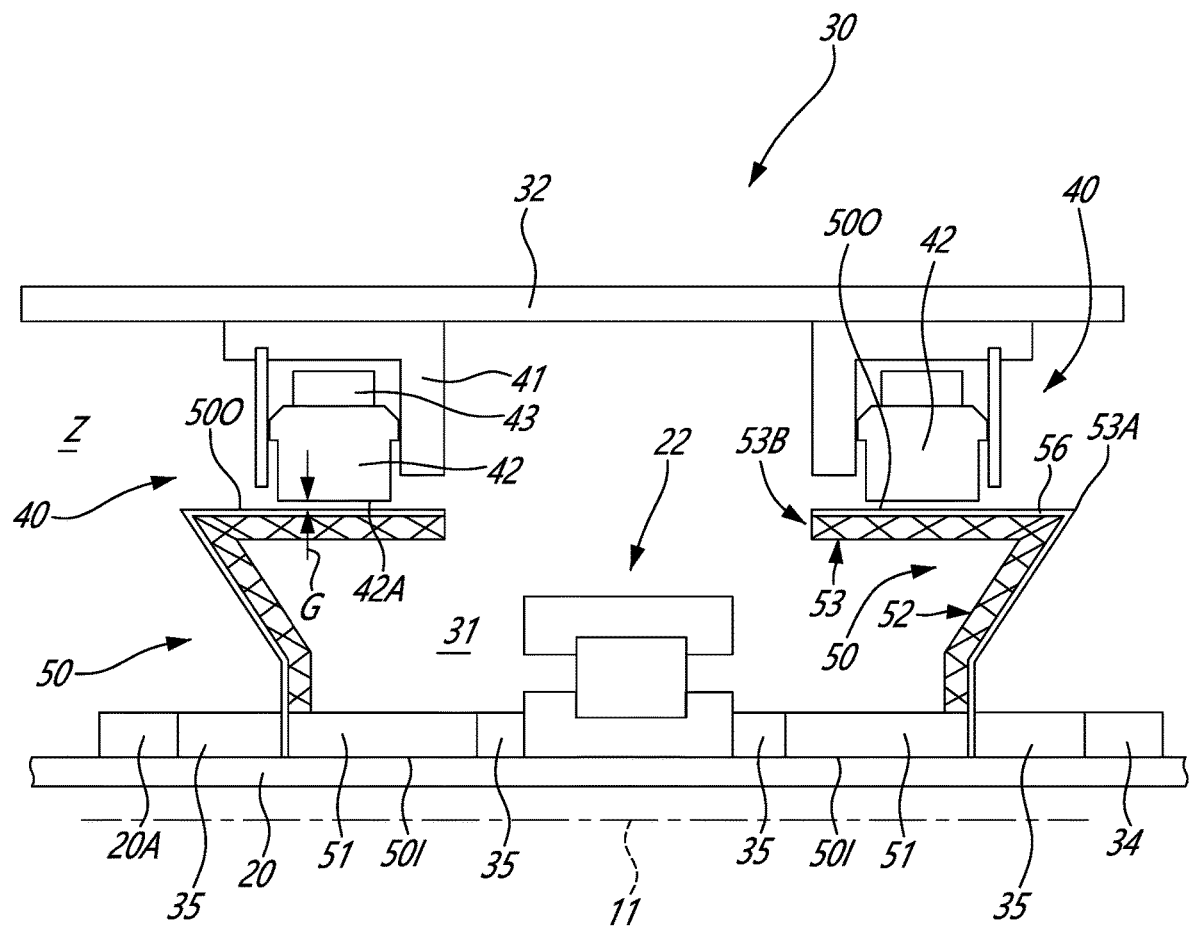
FIG. 2 is a cross-sectional view of a bearing housing assembly of the gas turbine engine of FIG. 1.

Referring now to FIG. 2, the gas turbine engine 10 includes a bearing housing assembly 30 for containing a bearing 22 used for rollingly supporting one of the shafts (e.g., low-pressure shaft 21, high-pressure shaft 20) of the gas turbine engine 10. The gas turbine engine 10 may include many bearing housing assemblies each containing one or more bearing 22. The bearing housing assembly 30 defines a bearing cavity 31 that contains the bearing 22. The bearing cavity 31 is supplied with oil for lubricating the bearing 22. The bearing housing assembly 30 includes a bearing housing 32 secured to a structural component of the gas turbine engine 10, such as a casing thereof, and seal assemblies 40, herein two seal assemblies, disposed on opposite sides of the bearing 22, for restricting the oil from leaking out of the bearing cavity 31.

The seal assemblies 40 are disposed between a static component, such as the bearing housing 32, and a rotating component, such as the high-pressure shaft 20. Since the two seal assemblies 40 are similar, the below description will use the singular form for clarity, but it is understood that the description below may apply to both seal assemblies 40.

In the present embodiment, the seal assembly 40 is a non-contacting seal, also referred to as a controlled gap seal. Herein, the expression "non-contacting seal" refers to a type of seal in which two complementary portions of the seal are designed to be spaced apart by a controlled gap G during typical operating conditions. The small, controlled gap G limits gas flow and thus maintains a positive pressure differential leading into the bearing cavity 31, and due to the positive pressure, the bearing lubricant may be kept within the bearing cavity 31. The gap G may vary in size with, for instance, changes in the operating conditions, vibrations typically occurring during normal operations, thermal expansion, and deformation imparted due to centrifugal force. In some cases, the two complementary portions may contact each other. Such contacts are typically limited during a mission. When they occur, the two components typically do not remain in contact for a long time (e.g., a few seconds).

One of the challenges in a non-contacting seal consists in keeping a dimension of the gap G between the two complementary portions substantially constant so that it is able to maintain a pressure differential between the bearing cavity 31 and a zone Z outside the bearing cavity 31 while limiting contacts between the complementary portions, and in maintaining the dimension of the gap G throughout varying operating conditions. Some occasional contact is accepted. However, prolonged contact may result in excessive heat generation that may impair a proper operation of the gas turbine engine 10.

In the embodiment shown, the seal assembly 40 includes a support 41 that houses a sealing ring 42, also referred to as a carbon ring. The sealing ring 42 annularly and continuously extends all around the central axis 11. Stated otherwise, the sealing ring 42 may be integral, as opposed to being formed of separate segments. The continuous aspect of the sealing ring 42 imparts a certain amount of structure, such as a continuous arch, which may allow to resist forces such as forces stemming from a pressure differential for instance, and to maintain the controlled gap G. The seal assembly 40 includes a counter component, referred to as a seal runner 50, that cooperates with the sealing ring 42. The sealing ring 42 and the seal runner 50 are concentric about the central axis 11. In the depicted embodiment, the sealing ring 42 is located radially outwardly to the seal runner 50. However, in some other embodiments, the sealing ring 42 may be located radially inwardly of the seal runner 50. It is understood that the support 41 may be defined by an engine casing or by the bearing housing 32.

The seal runner 50 and the sealing ring 42 rotate relative to each other about the central axis 11. The seal runner 50 and the sealing ring 42 define respective sealing faces facing one another and spaced apart from one another by the gap G. In the embodiment shown, the gap G is a radial gap that extends axially relative to the central axis 11. The gap G extends along a radial direction relative to the central axis 11 and has a radial height.

The gap G fluidly connects the bearing cavity 31 with the zone Z outside the bearing cavity 31. In the embodiment shown, to limit lubricant contained within the bearing cavity 31 from leaking, pressurized air (e.g. air taken from one or more compressor stage) may be used to increase an air pressure outside the bearing cavity 31 beyond the pressure within the bearing cavity 31, thereby creating a positive pressure differential therebetween. A controlled, relatively small amount of compressed air may continuously leak into the bearing cavity 31 via the gap G, which may prevent oil leakage in the opposite direction. The compressed air may come from the compressor section 14 of the gas turbine engine 10.

In the embodiment shown, the seal assembly 40 includes a shrink band 43 is disposed around the sealing ring 42. The shrink band 43 may be made of a material having a similar coefficient of thermal expansion (CTE) than that of the seal runner 50. In the embodiment shown, the shrink band 43 is made of the same material than that of the seal runner 50. The shrink band 43 is in engagement with an outer face of the sealing ring 42. The shrink band 43 is heat shrunk or shrink fitted around the sealing ring 42 so as to decrease a diameter of the sealing ring 42. The shrink band 43 may frictionally engage the sealing ring 42. In other words, an inner diameter of the shrink band 43 may be less than an outer diameter of the sealing ring 42 before the shrink band 43 is disposed around the sealing ring 42.

In use, a temperature increase may result in expansion of the seal runner 50 and of the shrink band 43 in a similar manner as they have similar CTEs. An increase in temperature of the shrink band 43 may therefore result in an increase in its diameter and may allow the sealing ring 42 to also increase in diameter in the same manner as the shrink band 43. In other words, thermal expansion of the shrink band 43 allows the sealing ring 42 to expand toward an original shape of the sealing ring 42; the original shape corresponding to a shape of the sealing ring 42 before the shrink band 43 was heat shrunk around the sealing ring 42. In some cases, thermal expansion of the shrink band 43 allows a diameter of the sealing ring 42 to extend beyond an original diameter of the sealing ring 36. In a particular embodiment, the seal clearance (e.g., gap G) is controlled thermally. The gap G may gradually close as the speed and temperature increase, thus the term 'controlled gap'. This may be made possible by designing the composite seal ring (e.g., sealing ring 36) to have a similar thermal expansion rate to that of the rotating element with compensation to account for the centrifugal growth.

However, when the gas turbine engine 10 is cold, a dimension of the gap G is expected to be greater than when hot. This may result in leakage and efficiency penalties during the transition period during which the gas turbine engine 10 is warming up to its steady state operating temperature. The gap G closes as the temperature rises because of thermal growth and centrifugal force on the seal runner 50. In some embodiments, the thermal growth accounts for about 80% of the total radial deformation whereas the centrifugal force is responsible for a remainder (e.g., 20%) of the total radial deformation. The seal runner 50 disclosed herein may at least partially alleviate these drawbacks.

In the embodiment shown, the seal runner 50 is axially clamped on the high-pressure shaft 20, herein between a protrusion 20A of the high-pressure shaft 20 and a nut 34 threadingly engaged to the high-pressure shaft 20. Any suitable means of axially clamping the seal runner 50 on the shaft is contemplated. One or more spacer(s) 35 may be disposed between the seal runner 50 and the bearing 22. Herein, a spacer 35 is disposed between a left seal runner and the bearing 22 and another spacer 35 is disposed between the bearing 22 and a right seal runner. Other configurations are contemplated. In some embodiments, these spacers 35 may be omitted. The nut 34 may be torqued sufficiently to exert an axial compressive force on the seal runner 50.

Referring now to FIGS. 2-3, the seal runner 50 is described in greater detail. The seal runner 50 extends radially relative to the central axis 11 from an inner face 501 to an outer face 500. The inner face 501 faces the high-pressure shaft 20 and the central axis 11 whereas the outer face 500 faces the sealing ring 42 (FIG. 2). The outer face 500 is radially spaced apart from an inner face 42A of the sealing ring 42 by the gap G.

Referring more particularly to FIG. 3, in the embodiment shown, the seal runner 50 includes an inner section 50A that extends from the inner face 501 towards the outer face 500 and an outer section 50B that extends from the outer Face 500 towards the inner face 501. A boundary between the inner section 50A and the outer section 50B is shown with a dashed line in FIG. 3. Typically, the inner section 50A would include a base 51 of the seal runner 50 that is axially clamped on the high-pressure shaft 20. The seal runner 50 further includes a web 52 and a sealing flange 53. The sealing flange 53 is secured to the base 51 via the web 52. The base 51, the web 52, and the sealing flange 53 may be parts of a single monolithic body of the seal runner 50. The base 51 defines the inner face 501 whereas the sealing flange 53 defines the outer face 500 of the seal runner 50. The outer section 50B may therefore include the web 52 and the sealing flange 53. However, it will be appreciated that, in some embodiments, the boundary between the inner section 50A and the outer section 50B may be disposed anywhere along the web 52. In some cases, the outer section 50B includes solely the sealing flange 53.

In use, the seal runner 50 is rotating about the central axis 11. Therefore, the seal runner 50 is exposed to centrifugal force in addition to the thermal growth caused by its increase in temperature during use. The centrifugal force exerted on the seal runner 50 increases with a radial position on the seal runner 50. In other words, a centrifugal force exerted on the outer section 50B is expected to be greater than the centrifugal force exerted on the inner section 50A since a speed at which the outer section 50B travels is greater than that of the inner section 50A. The centrifugal force is also function of the weight of the seal runner 50. Thus, to at least partially compensate for the increase in centrifugal force, the outer section 50B of the seal runner 50 has a density that is less than a density of the inner section 50A. Put differently, the seal runner 50 may define a gradient density in a radial direction relative to the central axis 11. The density may thus decrease in a radially outward direction away from the central axis 11. Herein, the density is expressed in units of mass per units of volume (e.g., kg/m$^3$). The density may continuously decrease or may decrease in a discrete manner. The density typically decreases in a monotonic fashion in that it may decrease from a first position to a second position located outwardly of the first position, may remain constant from the second position to a third position located outwardly of the second position, and may continue to decrease from the third position, but the density may never increase in the radially outward direction.

In some embodiments, the inner section 50A may have a first density whereas the outer section 50B may have a second density less than the first density. The inner section 50A may be made of a first material having a first density and the outer section 50B may be made of a second material having a second density less than the first density. The first material may be different than the second material in some embodiments. In some other embodiments, the first material may be the same as the second material, but having a different structure. In the embodiment shown, the outer section 50B includes a cellular material, which defines a plurality of voids, whereas the inner section 50A is made of a solid material devoid of such voids.

In the context of the present disclosure, a cellular material includes materials characterized by their porous microstructure comprised of solid and void networks. In some embodiments, a cellular material includes a lattice structure. Such a lattice structure includes a matrix composed of a plurality of unit cells interconnected to each other. The cellular material may have an open cell structure or a closed cell structure. An open cell structure is characterized by the material being permeable whereas a closed cell structure is characterized by the presence of cell faces to make the material impermeable (i.e., watertight). For both open and closed cell structures, the cellular material may have stochastic structure or a periodic structure. For a stochastic structure, the cells are distributed within the material in a random fashion. For a periodic structure, the cells are distributed within the material along a pattern that is repeated periodically.

In some embodiments, the seal runner 50 may be manufactured by additive manufacturing. The inner section 50A may be manufactured as a single solid block, devoid of the cellular material, whereas the outer section 50B—including both of the web 52 and the sealing flange 53, or in some embodiments only the sealing flange 53—may be manufactured to create a cellular structure as described above. As shown in FIG. 3, the cellular structure includes unit cells having interconnected structural members 54 defining voids 55 therebetween. The seal runner 50 may be made of Inconel™, titanium, or any other suitable material able to withstand the harsh conditions of a gas turbine engine 10. A concentration of the void may increase in the radially outward direction. In other words, a ratio of a volume occupied by the voids 55 per units of volume of the seal runner may increase in the radially outward direction. Put differently, a ratio of a volume occupied by the structural members 54 per units of volume of the seal runner may decrease in the radially outward direction.

In the embodiment of FIG. 3, the cellular material has an open cell structure. Such an open cell structure may allow a fluid to flow through the cellular material. Since the seal runner 50 is used to prevent oil from leaking out of the bearing cavity 31 (FIG. 2), a top layer 56 is disposed over the seal runner 50 to overlap at least the open cell structure. The top layer 56 is devoid of the porous material and may be solid such as to be impermeable to prevent a fluid to flow there through. The top layer 56 herein defines the outer face 500 of the seal runner 50. The top layer 56 overlaps both of the sealing flange 53 and the web 52. The top layer 56 may overlap a side axial face of the base 51 in some cases. The top layer 56 overlaps the cellular material to prevent leakage through this cellular material. The top layer 56 may be omitted in some configurations, for instance, if the cellular material has a closed cell structure.

As shown in FIG. 3, the sealing flange 53 is cantilevered from a radially-outer end of the web 52. Upon rotation of the seal runner 50, this configuration may induce a phenomenon referred as "coning" in that the outer face 500 deforms from being a cylindrical face to being a frustoconical face. To at least partially alleviate this phenomenon, the sealing flange may decrease in mass from its root 53A at the web 52 to its tip 53B opposed to the root 53A. The sealing flange 53 may therefore define an axial gradient of density. In other words, the density of the sealing flange 53 may decrease in the axial direction relative to the central axis 11 from the root 53A to the tip 53B. This may be achieved in a number of ways. For instance, the cellular material of the sealing flange 53 may be manufactured such as to have an increased concentration of voids towards the tip 53B. Alternatively, or in combination, a radial thickness T of the sealing flange 53 may gradually decrease from the root 53A to the tip 53B.

In some embodiments, the seal runner 50 may be made of a single material having the same density throughout the entirety of the seal runner 50, but the sealing flange may exhibit a decrease in its radial thickness such that a mass or weight by unit of length of the sealing flange 53 decreases towards its tip 53B. In other words, the mass or weight by unit of length decreases as a distance from the root 53A of the sealing flange 53 increases. This may help in at least partially reducing the "coning" phenomenon.

The density of the different sections of the seal runner 50 may be adjusted as a function of many parameters such as the rotational speed, the operating temperature, and so on. Manufacturing the seal runner 50 by additive manufacture may allow to fine tune its density as a function of the requirements of the seal runner 50. In some embodiments, the seal runner 50 may be molded as a single monolithic piece and the cellular material may be created by machining. In other words, a machining tool may be used to remove material from the outer section 50B of the seal runner 50.

Referring now to FIG. 4, a method of sealing the bearing cavity 31 is shown at 400. The method 400 includes permitting a flow of compressed into the bearing cavity 31 through the gap G at 402; and at least partially compensating for an increase in a centrifugal force exerted on the outer section 50B of the seal runner 50 with the outer section 50B having a density less than that of the inner section 50A of the seal runner at 404.

In the embodiment shown, the at least partially compensating for the increase in the centrifugal force exerted on the outer section 50B of the seal runner 50 includes providing the seal runner 50 with the outer section 50B made of a cellular material.

The present disclosure relates to a seal runner having an upper portion, which is normally not the life limiting region of the runner, and thus manufactured to minimize the runner's mass. The runner thus includes cellular material, structured or unstructured porous microstructure that is comprised of solid and void networks, to optimize the runner's mass. This may not only significantly decrease the mass of the part, but may also minimize the operating surface radial displacement due to centrifugal load. This may allow to have a smaller cold clearance between the runner and the carbon seal. This may have a positive impact on the engine performance. Using cellular material may also allow to optimize the heat transfer to the runner body. This seal runner may help to lower the runner operating temperature which may help to reduce the cold clearance.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft engine, comprising:
    a shaft rotatable about a central axis;
    a housing mounted around the shaft, the shaft rotatable relative to the housing; and
    a seal assembly being a non-contacting seal disposed radially between the shaft and the housing relative to the central axis, the seal assembly having:
        a sealing ring mounted to the housing, and
        a seal runner secured to the shaft, the seal runner extending radially relative to the central axis from an inner face facing the shaft to an outer face facing the sealing ring and being radially spaced apart from the sealing ring by a gap, the seal runner having an inner section extending from the inner face towards the outer face, and an outer section extending from the outer face towards the inner face, the inner section and the outer section being parts of a monolithic body, a density of the outer section being less than that of the inner section, the density defined as a mass per unit of volume of the seal runner.

2. The aircraft engine of claim 1, wherein the inner section is made of a first material having a first density and the outer section is made of a second material having a second density less than the first density.

3. The aircraft engine of claim 1, wherein the outer section includes a cellular material.

4. The aircraft engine of claim 3, wherein the inner section is axially clamped on the shaft, the inner section devoid of the cellular material.

5. The aircraft engine of claim 1, wherein the seal runner includes a base secured to the shaft and defining the inner face, a sealing flange secured to the base and defining the outer face, and a web connecting the sealing flange to the base, the inner section corresponding to the base, the outer section including the sealing flange.

6. The aircraft engine of claim 5, wherein the outer section further includes the web.

7. The aircraft engine of claim 5, wherein the sealing flange includes a cellular material.

8. The aircraft engine of claim 7, wherein the cellular material has an open cell structure.

9. The aircraft engine of claim 8, wherein the outer face is defined by a top layer disposed over the cellular material, the top layer being impermeable.

10. A seal assembly, comprising
a sealing ring circumferentially extending around a central axis; and
a seal runner disposed radially inwardly of the sealing ring relative to the central axis, the seal runner having an inner face facing the central axis, and an outer face facing the sealing ring and spaced apart from the sealing ring by a gap, the seal runner including a base, a web protruding outwardly from the base, and a sealing flange secured to the base via the web,
wherein a density of at least a portion of the seal runner continuously decreases in a radially outward direction away from the central axis, the density defined as a mass per unit of volume of the seal runner.

11. The seal assembly of claim 10, wherein the seal runner includes an inner section defining the inner face and made of a first material having a first density, the seal runner includes an outer section defining the outer face and made of a second material having a second density less than the first density.

12. The seal assembly of claim 11, wherein the outer section includes a cellular material.

13. The seal assembly of claim 12, wherein the inner section is devoid of the cellular material.

14. The seal assembly of claim 10, wherein a density of the sealing flange is less than that of the base.

15. The seal assembly of claim 14, wherein a density of the web is less than that of the base.

16. The seal assembly of claim 14, wherein the sealing flange includes a cellular material.

17. The seal assembly of claim 16, wherein the cellular material has an open cell structure.

18. The seal assembly of claim 17, wherein the outer face is defined by a top layer disposed over the cellular material, the top layer being impermeable.

19. A method of sealing a cavity disposed radially between a housing and a shaft of an aircraft engine, the method comprising:
permitting a flow of compressed air into the cavity through a gap defined between a sealing flange of an outer section of a seal runner and a sealing ring of a seal, the seal runner secured to the shaft via an inner section of the seal runner disposed radially inwardly of the outer section, the inner section including a base mounted to the shaft, the sealing flange secured to the base via a web; and
at least partially compensating for an increase in a centrifugal force exerted on the outer section of the seal runner with at least a portion of the outer section having a density that continuously decreases in a direction that extends away from less than that of the inner section of the seal runner.

20. The method of claim 19, wherein the at least partially compensating for the increase in the centrifugal force exerted on the outer section of the seal runner includes providing the seal runner with the outer section made of a cellular material.

* * * * *